Dec. 16, 1924.
J. E. LARSH
1,519,316
DEVICE FOR IMPARTING ROTARY MOTION
Filed Nov. 6, 1922     2 Sheets-Sheet 1
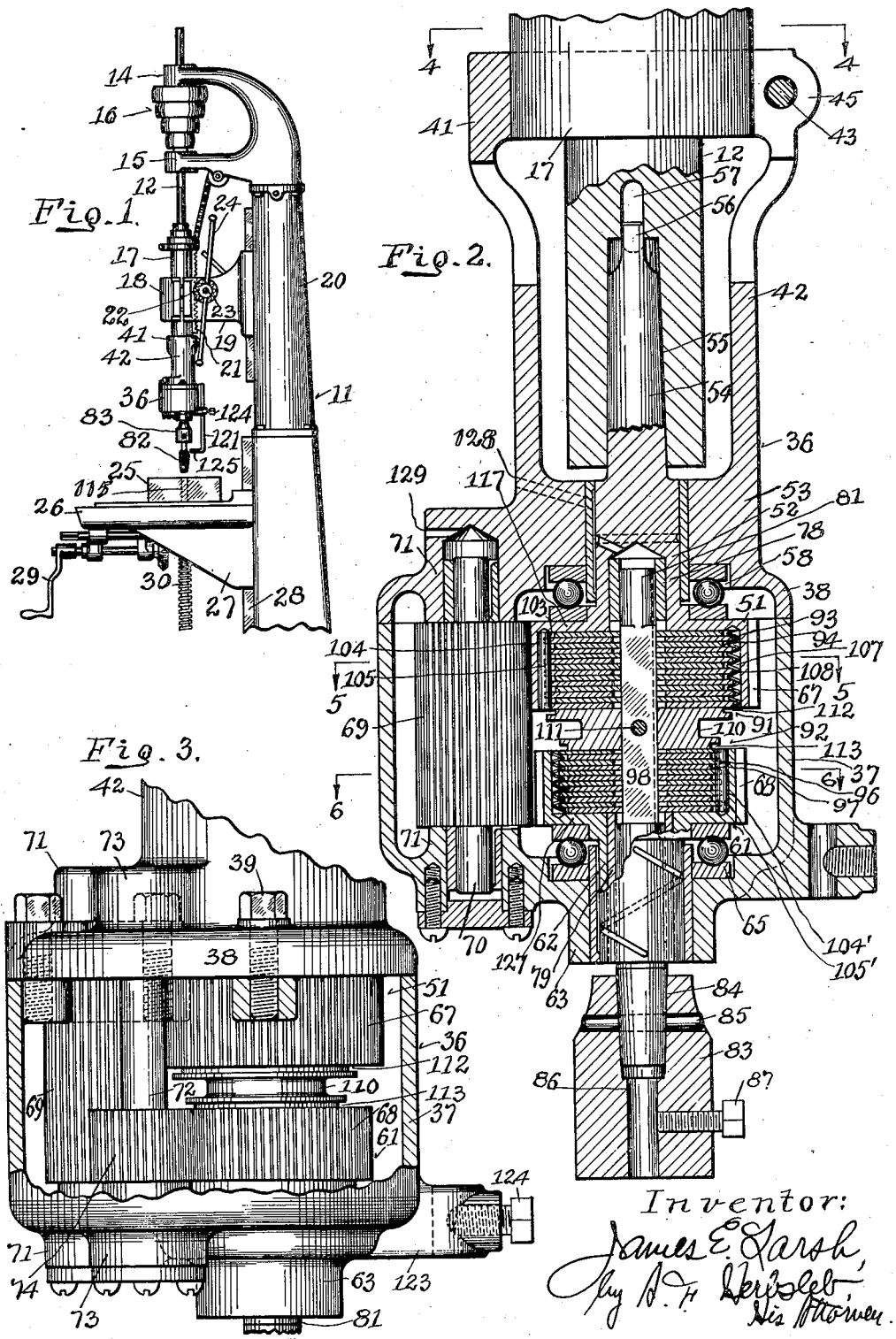

Dec. 16, 1924.  1,519,316
J. E. LARSH
DEVICE FOR IMPARTING ROTARY MOTION
Filed Nov. 6, 1922    2 Sheets-Sheet 2
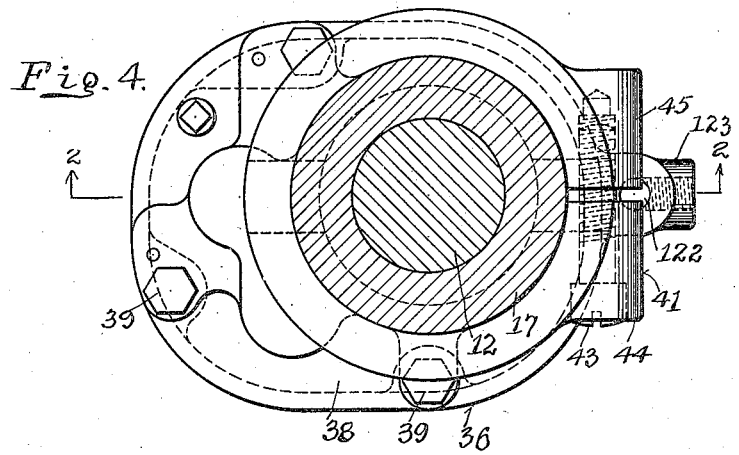
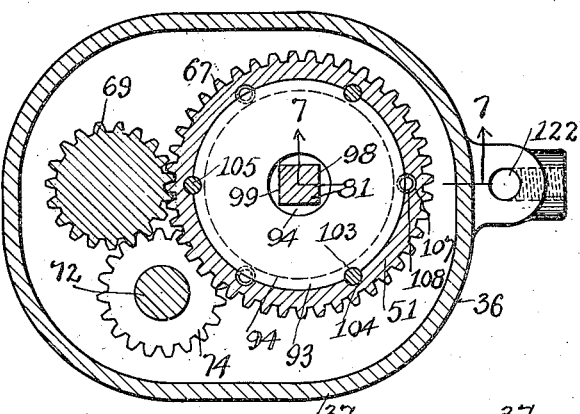
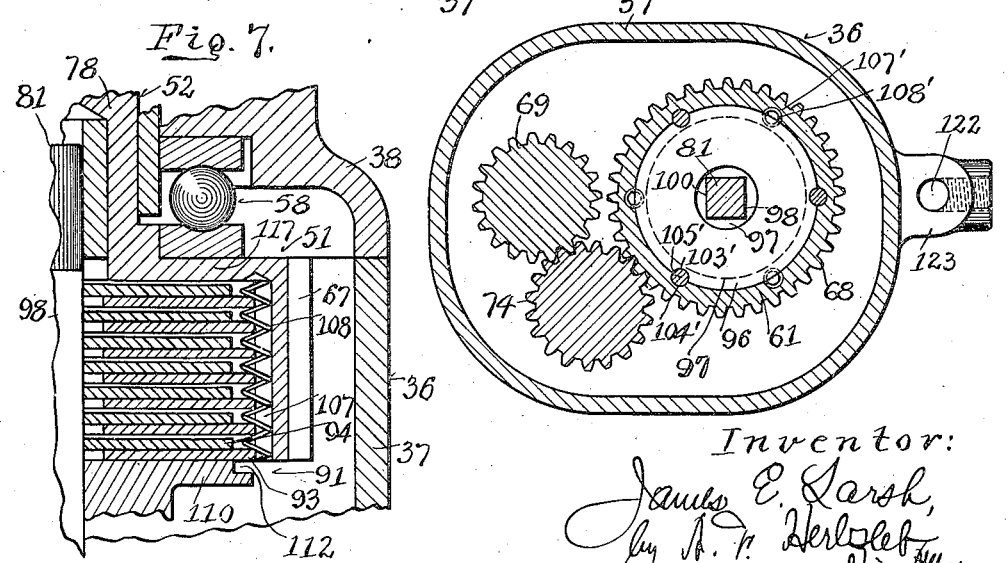
Inventor:
James E. Larsh, Patented Dec. 16, 1924.

1,519,316

UNITED STATES PATENT OFFICE.

JAMES E. LARSH, OF CHEVIOT, OHIO, ASSIGNOR TO THE FOSDICK MACHINE TOOL COMPANY, OF CINCINNATI, OHIO, A CORPORATION OF OHIO.

DEVICE FOR IMPARTING ROTARY MOTION.

Application filed November 6, 1922. Serial No. 599,269.

To all whom it may concern:

Be it known that I, JAMES E. LARSH, a citizen of the United States, residing at Cheviot, in the county of Hamilton and State of Ohio, have invented certain new and useful Improvements in Devices for Imparting Rotary Motion, of which the following is a specification.

My invention relates to means for imparting rotary motion and embodies means for imparting rotary motion in reverse directions. It further includes means whereby driving relation is effected by end pressure, for instance, between a threaded part and the work; for example in tapping, in which the end pressure is obtained between the threaded tapping-tool and the wall of the hole being threaded; in setting studs, in which the end pressure is obtained between the thread of the stud and the thread in the hole of the work into which the stud is being set; in applying nuts over threaded shanks, stems or bolts, in which end pressure is obtained between the thread of the nut and the thread of the shank, stem or bolt over which the nut is being threaded; and in other relations.

I have exemplified my invention as employed for attachment to a drilling machine, whereby rotation of the drilling spindle is communicated to a tapping-tool by pressure of the tool toward the work, and whereby reverse rotation is imparted to the tapping-tool by pressure of the tool against the work while passing out of the work.

It is the object of my invention to provide novel means whereby the spindle to which the threaded part is arranged to be secured, or the device intended to be rotated, is normally in inactive relation to the driving mechanism; further, to provide novel means whereby driving relation is established between the driving means and the driven member by pressure applied toward the work; further, to provide novel means whereby reverse rotation is imparted to the driven member by pressure away from the work; further, to provide novel means for causing release of driving relation in the driving mechanism; further, to provide novel means compactly arranged whereby to transmit the rotation of the driving spindle into forward or reverse rotation of the driven spindle; and, further, to provide novel arrangement of friction mechanism, and novel means for obtaining relief in the same.

The invention will be further readily understood from the following description and claims, and from the drawings, in which latter:

Fig. 1 is a side elevation of my improved device showing its connection in an exemplified drill press, the latter partly broken away.

Fig. 2 is an axial longitudinal section of my improved device, taken on the line 2—2 of Fig. 4.

Fig. 3 is a side elevation of my improved device partly broken away.

Fig. 4 is a cross-section of my improved device, taken in the plane of the line 4—4 of Fig. 2.

Fig. 5 is a cross-section of the same, taken in the plane of the line 5—5 of Fig. 2.

Fig. 6 is a cross-section of the same, taken in the plane of the line 6—6 of Fig. 2; and, Fig. 7 is an enlarged longitudinal axial section, taken in the plane of the line 7—7 of Fig. 5, and partly broken away, to show the normal separated relation of the friction disks.

My improved device is shown as an attachment to an exemplifying drill-press 11, comprising a drill-spindle 12 rotated in suitable manner and at different speeds, the spindle being shown journaled in bearings 14, 15, and having pulleys 16 of different diameters fixed thereto for driving the same. The spindle also rotates in a suitable spindle-sleeve 17, in which it has suitable bearings of usual construction, to permit rotation of the spindle in the sleeve, and to cause the spindle to move endwise with the sleeve. The sleeve is shown mounted in a bearing 18 of a bracket 19 adjustable in suitable manner on the column 20 of the drill-press.

The sleeve is held in suitable manner against rotation in said bearing, and is provided with a suitable rack 21 with which a pinion 22 meshes. The pinion is on a shaft 23 rotatable in a bearing on the bracket, and rotated by a suitable handle-bar 24, for moving the spindle-sleeve and the spindle up and down in the bearing 18, to move the spindle toward and from the work, exemplified at 25.

The work is suitably secured to a table 26, on a knee 27, adjustable up and down on the column on a guideway 28, by means of a handle 29, communicating in suitable manner with an adjusting screw 30 for raising and lowering the work.

My improved device comprises a frame 36, shown as a casing, the lower portion of which is exemplified as a housing 37, provided with a cover 38, secured to the housing by bolts 39, and having a split-bearing 41 on an upward extension 42 thereof. The split-bearing is arranged to be clamped about the lower end of the spindle-sleeve 17 by means of a clamp-screw 43, having journal connection in a cheek 44 and threaded into a threaded cheek 45 of the split-bearing, for clamping the split-bearing about the spindle-sleeve.

A socket-piece 51 has a journal 52, journaled in a bearing 53 of the casing. The socket-piece is provided with a stem 54, shown as a taper stem, received in the taper-socket 55 of the drill-spindle.

In attaching the device to the drill-press, the taper-stem 54 is forced upwardly into the taper-socket 55, so as to seat securely therein, for forming proper driving connection, the flat reduced extension 56 of the taper-stem being received in the usual drift-slot 57 in the drill-spindle, with the split-bearing received about the spindle-sleeve, whereupon the split-bearing is clamped about the sleeve.

There is an end-thrust bearing 58, shown as a ball-bearing, between the socket-member and the casing, shown at the bearing 53.

A reversely opening socket-member 61 is provided with a journal 62, journaled in a bearing 63 in the casing. An end-thrust bearing 65 is shown as a ball-bearing at the bearing 63, and is located between the latter socket-member and the casing.

The socket-member 51 is exemplified as having a gear 67 integral therewith, and the socket-member 61 is shown as having a gear 68 integral therewith. A gear 69, shown as an elongated gear, is fixed to a shaft 70, journaled in bearings 71 in the casing. A shaft 72 is journaled in bearings 73 in the casing, and has a pinion 74 thereon. One end of the gear 69 meshes with the gear 67, and the pinion 74 meshes with the other end of the gear 69, the pinion also meshing with the gear 68.

Direct drive-connection is therefore had between the drill-spindle and the gear 67, reverse driving connection being had from the latter through the gear 69 and the pinion 74 with the gear 68.

The socket-member 51 is provided with a bearing 78 and the socket-member 61 is provided with a bearing 79. A tapping-spindle 81 is journaled in these bearings. The tapping-spindle is arranged for having a suitable tapping-tool secured thereto by suitable means, such a tapping-tool being shown at 82. Securing connection between it and the tapping-spindle is shown as a chuck 83, having a socket 84, in which the protruding end of the tapping-spindle is received, a pin 85 forming a further connection between the chuck and the tapping-spindle. The end of the tapping-tool is received in a socket 86 of the chuck. A set-bolt 87, threaded in the chuck, is arranged to clamp the tapping-tool in place.

There is a friction-clutch 91 between the power member 51 of the reversing tapping-head and the tapping-spindle, and a reversing friction-clutch 92 between the reversing gearing and said tapping-spindle.

The friction-clutch 91 comprises a series of friction-plates 93 which have continuous rotative connection with the driving member 51 and normally rotate loosely about the tapping-spindle, and a series of friction-plates 94 which are arranged to be placed in operative or inactive relation with the friction-plates 93, and are normally in operative relation with the tapping-spindle.

The friction-clutch 92 comprises a series of friction-plates 96 which are normally in operative connection with the reversing member 61, and normally rotated loosely about the tapping-spindle and a series of friction-plates 97, which are normally in inactive relation with the friction-plates 96 and have continuous operative connection with the tapping-spindle.

The operative connections between the friction-plates 94 and 97 and the tapping-spindle are exemplified as accomplished by forming the tapping-spindle of polygonal cross-section, for instance, square, as shown at 98, within the range of movements of the friction-plates, the connections compelling said friction-plates and the tapping-spindle to rotate together, but permitting axial movements between the tapping-spindle and the friction-plates.

The friction-plates 94 are provided with polygonal apertures 99, shown as square apertures, received about the correspondingly formed portion of the tapping-spindle, and the friction-plates 97 are exemplified as provided with apertures 100 of polygonal cross-section, shown as square, received about and complemental to the similarly formed portion of the tapping-spindle.

The friction-plates 93 are at their outer peripheries provided with recesses 103, the socket-member 51 being provided with mating recesses 104, pins 105 being received in said respective recesses for operatively connecting said socket-member and the friction-plates 93 in rotative direction, but permitting axial movement between the parts. These recesses are exemplified as extending parallel with the axis of the socket-member and the friction-plates.

The socket-member is also provided at its inner periphery with recesses 107, shown extending parallel with the axis of the socket-member, springs 108 being received in these recesses. These springs are exemplified as helical springs, the inner portions of the helices whereof extend within the inner periphery of the socket-member into range with the outer peripheries of the friction-plates 93. The inner plates of the helices of the springs correspond preferably in positions with the spaces between the outer peripheries of the friction-plates 93, in such manner that the several helices of the springs normally cause operative separation between the friction-plates 93, which have operative connection with the socket-member 51, and the friction-plates 94, which have operative connection with the tapping-spindle, as more particularly shown in Fig. 7. This operative separation is such that when the friction-clutch 91 is relieved, operative relief in the friction-clutch is instantaneous and complete so that cessation of motion may be instantly had.

Fig. 7 represents release condition in said friction-clutches. It will be noted from this figure that when relief of pressure between the surfaces of the friction-plates is obtained, that the helical springs insure this relief throughout the full range of the plurality of friction-plates, separating each pair of friction-plates from its neighboring pair, and acting on each of the friction-plates of larger diameter, in the present exemplification, for causing separation between each pair of said plates. Pressure relief between all of the friction-plates is obtained. The only contact left between the friction-plates, as shown in Fig. 7, is the contact due to the weight of the respective inner friction-plates resting upon the respective outer friction-plates, this weight being very slight and providing ready slippage between the outer plates and the inner plates.

A collar 110 is located between the clutches 91, 92, this collar being fixed to the tapping-spindle, as exemplified by the pin 111. The upper end of the collar is provided with a reduced portion 112, arranged to readily enter the space in the socket-member 51, for causing face pressure between the plates, and the other end of the collar is provided with a reduced end 113, arranged to readily enter the socket in the socket-member 61, for causing face pressure between the friction-plates in the latter socket-member.

The friction-clutch 92 is similarly constructed, the parts being designated by similar but primed reference numerals.

The release relation in the clutch 92 is the same as the release relation in the clutch 91 exemplified in Fig. 7 to cause instant and entire release of driving relation in the clutch.

In operation, if it is desired, for instance, to tap the hole 115, shown in the work 25, the handle 24 is swung for causing descent of the spindle-sleeve 12 and the tapping-spindle 81, whereby the tapping-tool 82 is caused to move toward the work.

When contact is had between the tapping-tool and the work, axial pressure is caused upon the tapping-spindle, which pressure is communicated to the collar 110 and by the collar transmitted to the friction-plates of the clutch 91, whereby its friction-plates are caused to move toward each other, thereby compressing the respective coils of the helical springs 108, and causing driving connection between the socket-member 51 and the tapping-spindle through the medium of the friction-plates of the clutch 91, by pressure upon the friction-plates between the collar 110 and the end wall 117 of the socket-member 51.

As this endwise movement of the tapping-spindle takes place, the springs 108' of the clutch 92 cause further separation between all of the neighboring pairs of the friction-plates 96, 97, of the clutch 92.

This relation of the friction-plates continues while axial pressure in tapping direction is exerted upon the spindle-sleeve.

If desired, a stop may be provided for limiting the entrance of the tapping-tool into the work. This stop is exemplified as a shank 121 received in a hole 122 of a lug 123 extending from the casing, and held in adjusted positions by means of a set-bolt 124. The end of the shank is bent, as shown at 125, for contacting the work, and thereby limiting endwise axial movement of the tapping-tool into the work. When the stop strikes the work, which takes place as soon as the tapping to the proper depth has been accomplished, the endwise pressure exerted by the handle 24 is transferred from the tapping-tool to the stop 121, thereby relieving pressure upon the disks of the friction-clutch 91, this relief of pressure causing separation by means of the respective coils of the helical springs between each pair of neighboring friction-plates, and thereby immediately causing cessation of rotation of the tapping-tool, and enabling extreme accuracy in the depth of the tapping to be obtained, and avoiding all injury to the thread being cut, due to the instant cessation of rotation of the tapping-tool.

When the handle 24 is reversed for raising the tapping-tool, the upper faces of the threads of the tapping-tool engage the upper wall of the groove forming the thread cut into the work, thereby exerting pressure downwardly upon the tapping-tool, which results in further separation throughout the disks of the friction-clutch 91, by the action of the individual coils of the helical springs, and causes compression of the respective coils of the helical springs 108' in the friction-clutch 92, and causing simultaneously operative pressure upon all of said friction disks of the friction-clutch 92, between the collar 110 and the end-wall 127 of the socket-member 61, for immediately reversely rotating the tapping-tool upon comparative slight axial pressure exerted by the tapping-tool, thereby preventing injury to the thread which has just been cut in the work. As soon as the tapping-tool has been raised so as to leave the work, the end-pressure between the tapping-tool and the work is released, thereby instantly releasing the operative pressure between all of the friction-plates of the friction-clutch 92, due to the separate action of all of the coils of the helical springs 108' upon the respective friction-plates 96 of greater diameter of said friction-clutch, for again normally placing the tapping-spindle in non-rotative condition.

My improved construction enables a great number of friction-plates to be employed in each of the friction-clutches for providing great power within small compass.

My improved device further provides a closed casing within which the operative parts are located and which may, if desired, be filled with oil, as through the oil holes 128, 129, therein.

Having thus fully described my invention, what I claim as new, and desire to secure by Letters Patent, is:

1. In a device of the character described, the combination of a spindle, a set of friction-plates for driving the same in a given direction, a set of friction-plates for driving the same in reverse direction, means between said spindle and said respective sets of friction-plates transmitting axial movements of said spindle in reverse directions to said respective sets of friction-plates for friction pressure between the plates of one of said sets of friction-plates and relief of friction pressure between the plates of the other of said sets of friction plates, and means for normally automatically causing relief of pressure between the plates of said respective sets of friction-plates.

2. In a device of the character described, the combination of a spindle, an inner series of friction-plates of each of two sets of friction-plates having rotative connection with said spindle, an outer series of friction-plates of each of said sets, means for rotating said last-named series of friction-plates of said respective sets in reverse directions, the plates of said respective inner series and outer series forming pairs of friction-plates, means normally automatically separating said pairs of plates, and pressure means on said spindle located between said sets of friction-plates and acting by axial movements of said spindle in reverse directions on said respective sets of friction-plates causing operative friction engagement between the plates of said respective sets of friction plates.

3. In a device of the character described, the combination with a drive spindle and a sleeve thereabout, a casing, connecting means on said casing for attachment of said casing to said sleeve, a socket-member journaled in said casing, a second socket-member journaled in said casing in axial alinement with said first-named socket-member, driving means having operative connections with said spindle and said respective socket-members for driving said socket members in reverse directions, a driven spindle for said socket-members, a set of friction-plates in the socket of each of said socket-members, each of said sets comprising pairs of friction-plates respectively having drive-connection with said driven spindle and with their socket-member, said driven spindle provided with means causing friction pressure between the friction-plates of said respective sets of friction-plates, and means normally automatically causing relief of said friction pressure.

4. In a device of the character described, the combination with a drive-spindle and a sleeve thereabout, a casing, connecting means on said casing for attachment of said casing to said sleeve, a socket-member journaled in said casing and provided with means for drive-connection with said drive-spindle, a second socket-member journaled in said casing in axial alinement with said first-named socket-member, driving means between said socket-members for driving the same in reverse directions, a driven-spindle journaled in said socket-members, a set of friction-plates in the socket of each of said socket-members, each of said sets comprising pairs of friction-plates comprising friction-plates respectively having drive-connection with said driven spindle and with their socket-member, an actuating part on said driven-spindle causing friction pressure between the friction-plates of said respective sets of friction-plates by end forces, and means normally automatically separating said pairs of friction-plates.

5. In a device of the character described, the combination of a spindle arranged for receiving a thread-part for coaction with a threaded part of a piece of work, a pair of friction-clutches surrounding said spindle, a driving means for each of said friction-clutches, said driving means rotating in reverse directions, each of said friction clutches comprising a series of friction-plates having rotative connection with said spindle and a series of friction-plates having rotative connection with the driving means of said clutch, the plates of said respective series forming pairs of plates, means normally automatically causing separation between said pairs of plates, and means whereby end-pressure of said thread-part with said work in either direction causes operative friction engagement in one of said clutches and relief of friction engagement between the pairs of friction-plates in the other of said clutches.

6. In a device of the character described, the combination of a drive-spindle, a sleeve therefor, a casing, means for securing said casing to said sleeve, a driven spindle in said casing, said driven spindle arranged for receiving a thread-part for coaction with a threaded part of a piece of work, a pair of friction-clutches between said drive-spindle and said driven spindle, and means for rotating said friction-clutches in reverse directions, each of said friction-clutches comprising friction-plates, helical springs normally separating said friction-plates by engagement of the respective helices of said springs with said respective friction-plates, and means operatively located between said driven spindle and said respective friction-clutches constructed and arranged whereby end-pressure between said thread-part and the work causes friction drive-connection in said respective clutches resisted by said springs in said respective clutches.

7. In a device of the character described, the combination of a frame, a pair of rotatable socket-members journaled in said frame, means for driving said members in opposite directions, a spindle journaled in said socket-members, pairs of friction-plates in each of said socket-members respectively comprising friction-plates having rotative connection with said spindle and friction-plates having rotative connection with said respective socket-members, and spiral springs in each of said socket-members the respective spirals whereof have connection with the respective pairs of plates in said respective socket-members to normally separate said pairs of friction-plates, and a presser-part on said spindle arranged for causing friction-contact between the friction-plates in said respective socket-members by axial pressure between a part on said spindle and the work.

In testimony whereof, I have hereunto signed my name in the presence of two subscribing witnesses.

JAMES E. LARSH.

Witnesses:
NORMAN B. CHASE,
ALMA W. KUNZE.